US012568265B1

(12) United States Patent
Cho et al.

(10) Patent No.: US 12,568,265 B1
(45) Date of Patent: Mar. 3, 2026

(54) TOOLS FOR MANAGING PARALLEL VIDEO SEGMENT EXCHANGES WITH MEMBERS OF A GROUP OF PEOPLE

(71) Applicant: Emovid Corporation, Seattle, WA (US)

(72) Inventors: Victor Cho, Burlingame, CA (US); Rupali Pathania, Redmond, WA (US); Digvijay Chauhan, Redmond, WA (US)

(73) Assignee: Emovid Corporation, Seattle, WA (US)

( * ) Notice: Subject to any disclaimer, the term of this patent is extended or adjusted under 35 U.S.C. 154(b) by 0 days.

(21) Appl. No.: 18/946,750

(22) Filed: Nov. 13, 2024

(51) Int. Cl.
*H04N 7/173* (2011.01)
*H04N 21/2743* (2011.01)
*H04N 21/475* (2011.01)

(52) U.S. Cl.
CPC ..... *H04N 21/2743* (2013.01); *H04N 21/4758* (2013.01)

(58) Field of Classification Search
CPC ....................... H04N 21/2743; H04N 21/4758
USPC ......................................... 725/116
See application file for complete search history.

(56) References Cited

U.S. PATENT DOCUMENTS

| | | | | | |
|---|---|---|---|---|---|
| 9,344,606 | B2 * | 5/2016 | Hartley | .................. | G11B 27/34 |
| 10,420,486 | B1 * | 9/2019 | McNair | ................ | A61B 5/7455 |
| 11,652,958 | B1 * | 5/2023 | Geddes | .................. | H04N 7/147 |
| | | | | | 348/14.09 |
| 11,954,645 | B2 * | 4/2024 | Seacat Deluca | ....... | G06Q 10/10 |

| | | | | | |
|---|---|---|---|---|---|
| 12,120,396 | B2 * | 10/2024 | Scott-Green | ....... | H04N 21/2743 |
| 12,432,400 | B2 * | 9/2025 | Tseng | .................. | G10L 15/1822 |
| 2002/0138843 | A1 * | 9/2002 | Samaan | ............. | H04N 7/17318 |
| | | | | | 348/E7.071 |
| 2003/0018974 | A1 * | 1/2003 | Suga | .................. | H04N 21/4622 |
| | | | | | 725/86 |
| 2008/0059986 | A1 * | 3/2008 | Kalinowski | ........ | H04N 21/2743 |
| | | | | | 725/112 |
| 2013/0081082 | A1 * | 3/2013 | Riveiro Insua | .. | H04N 21/47205 |
| | | | | | 725/38 |
| 2013/0188923 | A1 * | 7/2013 | Hartley | ............ | H04N 21/44016 |
| | | | | | 386/241 |
| 2013/0188932 | A1 * | 7/2013 | Hartley | ................... | H04N 9/87 |
| | | | | | 386/282 |
| 2013/0239140 | A1 * | 9/2013 | Demirtshian | .......... | H04N 21/47 |
| | | | | | 725/37 |

(Continued)

OTHER PUBLICATIONS

U.S. Appl. No. 18/735,893, Non-Final Office Action mailed Sep. 26, 2024, 22 pages.

(Continued)

*Primary Examiner* — Sahar Aqil Riaz
(74) *Attorney, Agent, or Firm* — Seed Intellectual Property Law Group LLP

(57) ABSTRACT

A facility for visually representing a parallel video exchange conversation is described. The facility records an original video segment depicting a first user, and receives first input specifying multiple addressee users. The facility makes the original video segment available to view by each of the addressee users. For each of some or all of the addressee users, the facility receives an indication that the addressee user has recorded a response video segment to the original video segment. The facility causes visual indications of the response video segments to be simultaneously displayed to the first user.

26 Claims, 13 Drawing Sheets

(56)                    References Cited

U.S. PATENT DOCUMENTS

| | | | | |
|---|---|---|---|---|
| 2013/0347036 A1* | 12/2013 | Athias | ............. | H04N 21/26258 |
| | | | | 725/38 |
| 2014/0096167 A1* | 4/2014 | Lang | ................. | H04N 21/4788 |
| | | | | 725/91 |
| 2014/0372910 A1* | 12/2014 | Alford Mandzic | .... | G06Q 50/01 |
| | | | | 715/753 |
| 2015/0318020 A1* | 11/2015 | Pribula | ............. | H04N 21/2743 |
| | | | | 386/290 |
| 2017/0026672 A1* | 1/2017 | Dacus | ............. | H04N 21/23418 |
| 2017/0134828 A1* | 5/2017 | Krishnamurthy | ............................ | |
| | | | | H04N 21/47202 |
| 2017/0185254 A1* | 6/2017 | Zeng | .................... | G06Q 10/101 |
| 2017/0201478 A1* | 7/2017 | Joyce | ................. | H04N 21/8549 |
| 2018/0048599 A1* | 2/2018 | Arghandiwal | ........ | H04L 51/216 |
| 2019/0026802 A1* | 1/2019 | McDevitt | ........... | G06Q 30/0641 |
| 2020/0226701 A1* | 7/2020 | Griebat | ................. | H04L 41/026 |
| 2020/0335132 A1* | 10/2020 | Fahy | ................... | G11B 27/031 |
| 2020/0336718 A1* | 10/2020 | Yoon | .................... | G06F 40/169 |
| 2021/0042830 A1 | 2/2021 | Burke | | |
| 2021/0099505 A1* | 4/2021 | Ravine | ................. | G06F 3/0346 |
| 2022/0319548 A1* | 10/2022 | Che | ........................ | G11B 27/34 |
| 2023/0386208 A1* | 11/2023 | Jin | ...................... | G06F 16/7844 |
| 2024/0005415 A1* | 1/2024 | Gray | ...................... | G06Q 50/01 |
| 2024/0273612 A1* | 8/2024 | Taylor | ............. | H04N 21/47815 |
| 2024/0325932 A1* | 10/2024 | Mulligan | .............. | A63F 13/537 |
| 2024/0330380 A1 | 10/2024 | Chauhan et al. | | |
| 2024/0386362 A1* | 11/2024 | Piccolo | ............. | G06Q 10/1053 |
| 2024/0412261 A1* | 12/2024 | Luk | .................... | G06Q 30/0613 |
| 2025/0054068 A1* | 2/2025 | Arriaga | ................. | G06Q 40/08 |
| 2025/0077768 A1* | 3/2025 | Smoot | .................... | G06F 40/20 |

OTHER PUBLICATIONS

Arnebäck, "An Intuitive Explanation of using Poisson Blending for Seamless Copy-and-Paste of Images", retrieved Sep. 25, 2024 from https://erkaman.github.io/posts/poisson blending.html, 15 pages.
Liu et al., "Video synthesis of human upper body with realistic face", arXiv:1908.06607v3 [cs.CV], Sep. 12, 2019, 3 pages.
Wikipedia, "Alpha compositing", retrieved Sep. 25, 2024 from https://en.wikipedia.org/wiki/Alpha_compositing, 8 pages.
Wikipedia, "Sound film", retrieved Sep. 26, 2024 from https://en.wikipedia.org/wiki/Sound_film, 1 page.
Zhou et al., "Talking Face Generation by Adversarially Disentangled Audio-Visual Representation", arXiv:1807.07860v2 [cs.CV], Apr. 23, 2019, 9 pages.

* cited by examiner

TOOLS FOR MANAGING PARALLEL VIDEO SEGMENT EXCHANGES WITH MEMBERS OF A GROUP OF PEOPLE

BACKGROUND

In order to communicate with others about a topic, a person might record an audio/video segment of themself speaking about that topic. The speaker can send a link to view such an audio/video segment to one or more people, such as by email, SMS, instant message, etc.

As one example, the CEO of a company might record an audio/video segment in which the CEO expresses appreciation about the company's work on a successful project, and send it to all of the members of a team working on the project for the company, such as by sending an email message addressed to all of the team members that contains a link to or embeds the audio/video segment.

DETAILED DESCRIPTION

Figure 1:
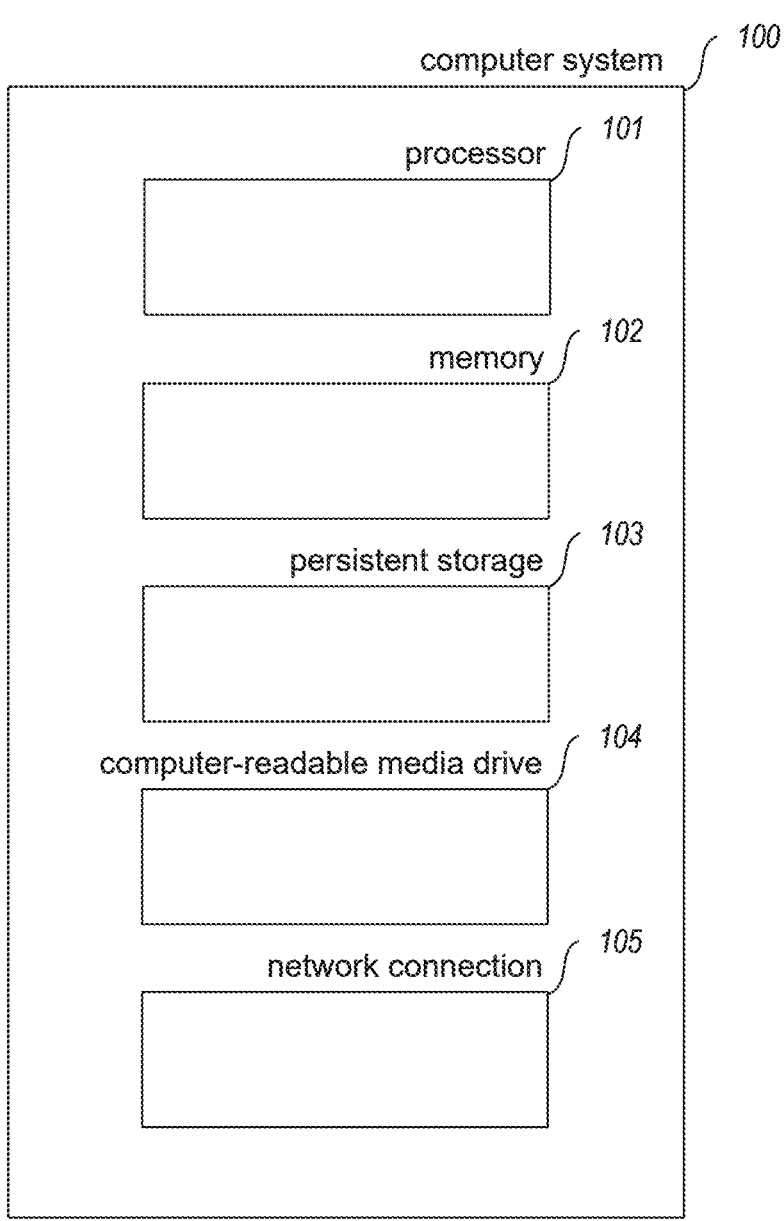
FIG. 1 is a block diagram showing some of the components typically incorporated in at least some of the computer systems and other devices on which the facility operates.

The inventors have recognized disadvantages in conventional approaches to sending the same audio/video segment (also "segment" or "video segment" herein) to a number of different people.

In some cases, a recipient may reply-all to the email message containing the segment or a link to it, resulting in a large group conversation that has the potential to turn into a free-for-all that flows out of the control of the sender.

Even when this does not occur, it can be difficult for the sender to process, organize, and grasp individual responses to the segment, any of which can end up as a longer conversation; these tend to become poorly organized, distributed throughout sender's inbox, with little ability to assess overall response to the segment or take appropriate action in response to individual responses or groups of them.

These disadvantages discourage many recorders of videos from sending or publishing them to groups of recipients, depriving them of the benefits of doing so.

In response to these recognitions, the inventors have conceived and reduced to practice a software and/or hardware facility providing tools for managing parallel video segment exchanges with members of a group of people ("the facility").

In some embodiments, the facility causes the initial segment to be presented to its recipients (or "addressees") in a way that prevents each recipient from learning the identity of the other recipients. Each recipient has the option of replying privately to the sender, such as by sending their own response segment to the sender, typing a response, and/or answering survey questions. The sender can in turn send a further private response to a responding recipient.

In some embodiments, a recipient can forward the initial segment to a new user, who can then themself respond to the initial sender.

In some embodiments, the facility organizes conversations beginning from the initial segment on behalf of the sender in a single, focused user interface, such as one showing a list of responding recipients, showing a set of responsive segments, and/or showing a set of threaded conversations with recipients. In some embodiments, the facility provides tools that enable the sender to control the display of these responses and conversations, such as sorting, filtering, favoriting, and searching among the responses and conversations. In various embodiments, the sender can perform these actions with respect to metadata about the responses and conversations, such as date and time sent; transcripts of the responses and conversations, such as those created by automatic speech transcription; and/or linguistic analysis of the speech or its transcription, such as sentiment analysis.

In some embodiments, the facility permits the sender to send a follow-up message to all of the recipients; in some cases, the follow-up message can forward a response segment received from one recipient, so that that response segment is shared with all of the recipients under the control of the sender.

In some embodiments, the facility performs and surfaces analytics on the responses, such as by reporting on response sentiment ("Overall, the response to this is generally positive with 50% of people expressing positive emotion;" "These five particular customers are really angry and need attention"); subjects discussed ("These are the 10 top customer issues mentioned in this set of 50 video responses"); action item analysis ("These five responders are ready for you to send a proposal to, while these four need some additional information"); and metrics ("The Net Promoter score based on the feedback from this group is −20"). In some embodiments, the facility's analyses reflect answers given by addressees to a survey delivered by the facility in connection with the segment.

In some embodiments, the facility generates a summary of all responses, such as (a) a textual report on the trends and group sizes regarding what was said and how it was said (including answers to questions posed in the original video message), or (b) a video that interleaves information summarizing the responses with video snippets from the responses that exemplify trends identified in the summaries. In the textual versions, the originating users can click on the summary points to show exemplifying snippets from the responses.

By operating in some or all of the ways described above, the facility makes it easy for someone to send a segment to a large number of users, operate individual conversation threads with the responding recipients, and analyze and derive useful information from the responses.

Additionally, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by organizing responses and conversations relating to an initial segment in a single, specialized user interface, the facility saves processing resources that would otherwise be expended in operating a typical inbox user interface in which the user must navigate to find and read responses to a segment.

Further, for at least some of the domains and scenarios discussed herein, the processes described herein as being performed automatically by a computing system cannot practically be performed in the human mind, for reasons that include that the starting data, intermediate state(s), and ending data are too voluminous and/or poorly organized for human access and processing, and/or are a form not perceivable and/or expressible by the human mind; the involved data manipulation operations and/or subprocesses are too complex, and/or too different from typical human mental operations; required response times are too short to be satisfied by human performance; etc.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, FPGA, or ASIC; a computer memory 102-such as RAM, SDRAM, ROM, PROM, etc.— for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. None of the components shown in FIG. 1 and discussed above constitutes a data signal per se. While computer systems configured as described above are typically used to support the operation of the facility, those skilled in the art will appreciate that the facility may be implemented using devices of various types and configurations, and having various components.

Figure 2:
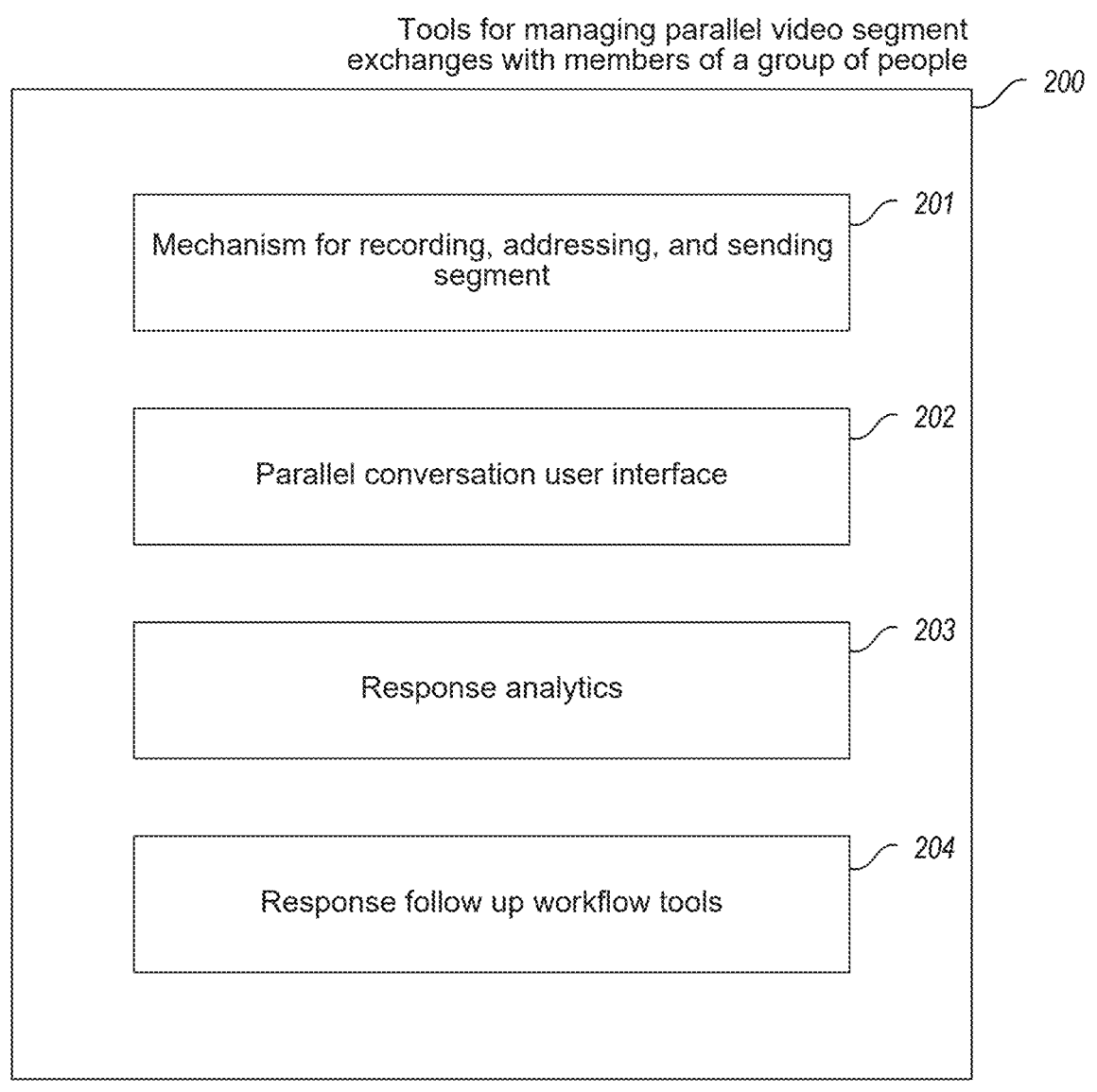
FIG. 2 is a subsystem diagram showing subsystems provided in connection with the facility in some embodiments.

FIG. 2 is a subsystem diagram showing subsystems provided in connection with the facility in some embodiments. These subsystems 200 correspond to tools for managing parallel video segment exchanges with members of a group of people. They include a mechanism 201 for recording, addressing, and sending a video segment; a user interface 202 for viewing and managing parallel conversations about the video segment with different users of the group; analytics 203 for analyzing the responses received from people in the group; and workflow tools 204 for following up on groups of responses. In various embodiments, the facility provides various combinations of these subsystems.

Figure 3:
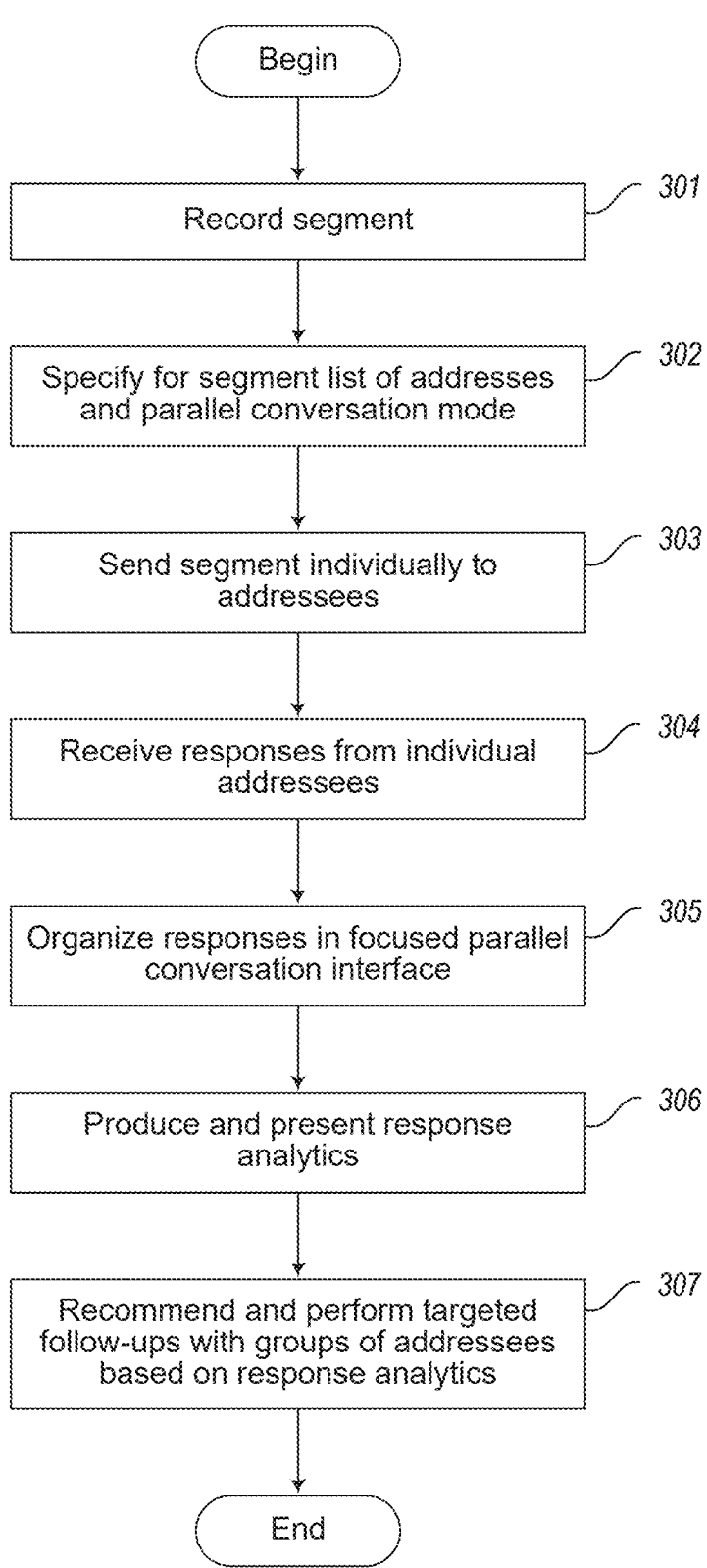
FIG. 3 is a flow diagram showing a process performed by the facility in some embodiments to manage parallel video segment exchanges with members of a group of people.

FIG. 3 is a flow diagram showing a process performed by the facility in some embodiments to manage parallel video segment exchanges with members of a group of people. In act 301, the facility provides a mechanism for the sender to record the video segment. In some embodiments, the facility uses techniques described in one or more of the following: U.S. patent application Ser. No. 18/617,384 entitled "REAL-TIME AI-DRIVEN SPEAKING SUGGESTIONS DURING ASYNCHRONOUS VIDEO CAPTURE," filed on Mar. 26, 2024; U.S. patent application Ser. No. 18/735,893, entitled "GENERATIVE FACIAL MAPPING AND BODY BLENDING DURING VIDEO CAPTURE," filed on Jun. 6, 2024; and U.S. Provisional Patent Application No. 63/657, 470, entitled "VIDEO AUTHENTICITY SEAL," filed on Jun. 7, 2024. In cases where the present application conflicts with a document incorporated by reference, the present application controls. In act 302, the facility specifies for the segment recorded in act 301 a list of addressees, and a parallel conversation mode, in some cases called "BCC mode."

Figure 4:
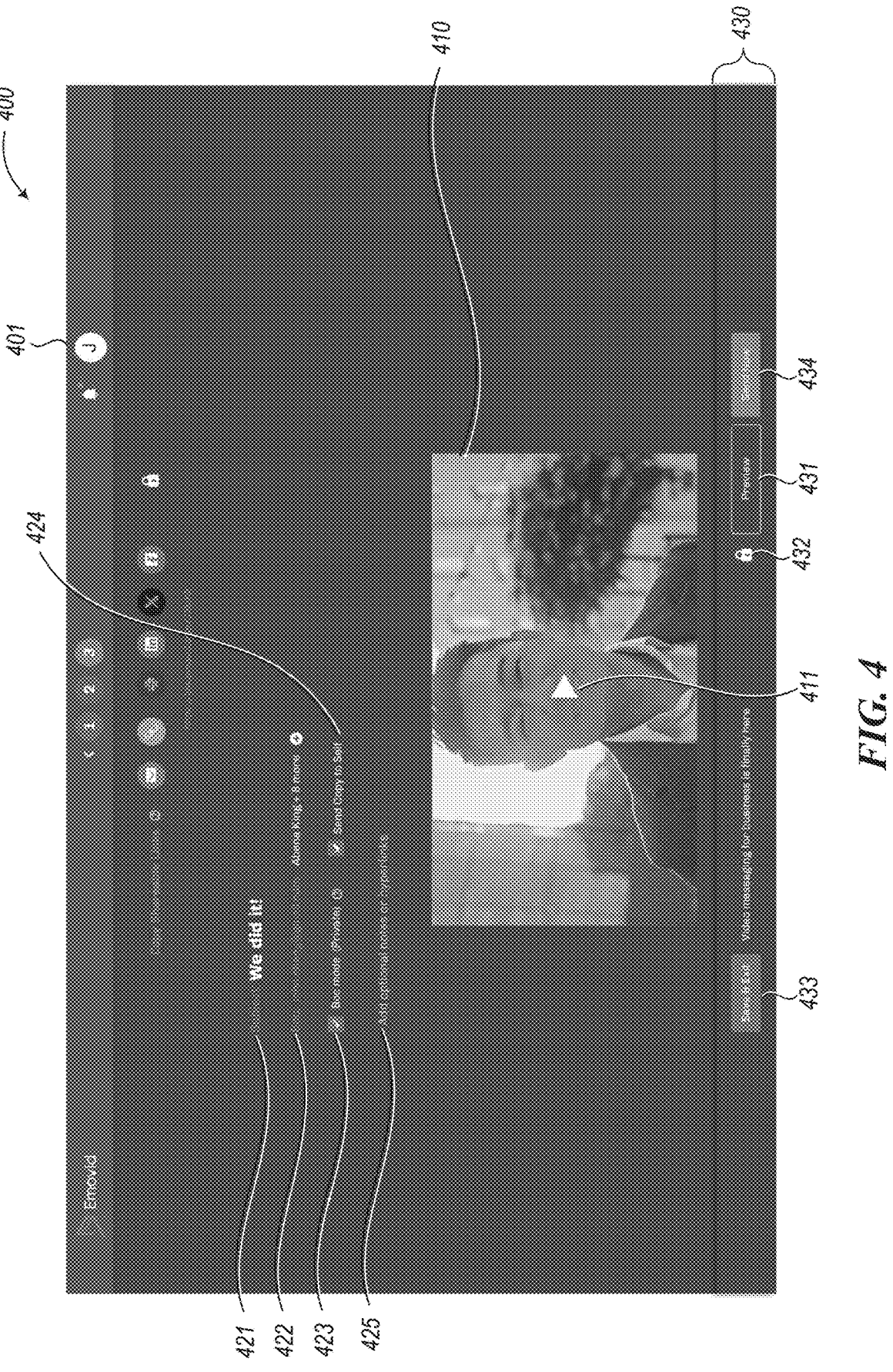
FIG. 4 is a display diagram showing sample contents of a first display presented by the facility in some embodiments to address a recorded segment and specify parallel conversation mode for it.

FIG. 4 is a display diagram showing sample contents of a first display presented by the facility in some embodiments to address a recorded segment and specify parallel conversation mode for it. The display 400 contains a user identification icon 401 containing the letter "J" corresponding to the sender, John Cheng, who has just recorded a video segment. The video segment is shown in region 410, and can be played using control 411. The sender can enter information used in sending the segment, including a subject 421 for the message conveying the segment; a list 422 of addressees, such as by their email addresses, names, SMS numbers, etc.; a checkbox 423 specifying whether or not the segment is sent in parallel conversation mode, i.e., "BCC mode"; a checkbox 424 specifying whether or not a copy of the message should also be sent to the sender; and notes or hyperlinks 425 to be included in the conveying message. For example, in this case, the sender has specified a subject of "We did it!," a list of addressees including "Abena King" and eight others; and BCC mode. The display also includes an action region 430 containing a control 431 for previewing the segment; a lock icon 432 for displaying controls for adjusting privacy and security settings for segment; a save and exit control 433; and a send now control 434 that the user can activate in order to send the segment based upon the existing information specified for it.

While FIG. 4 and each of the display diagrams discussed below show a display whose formatting, organization, informational density, etc., is best suited to certain types of display devices, those skilled in the art will appreciate that actual displays presented by the facility may differ from those shown, in that they may be optimized for particular other display devices, or have shown visual elements omitted, visual elements not shown included, visual elements reorganized, reformatted, revisualized, or shown at different levels of magnification, etc.

Figure 5:
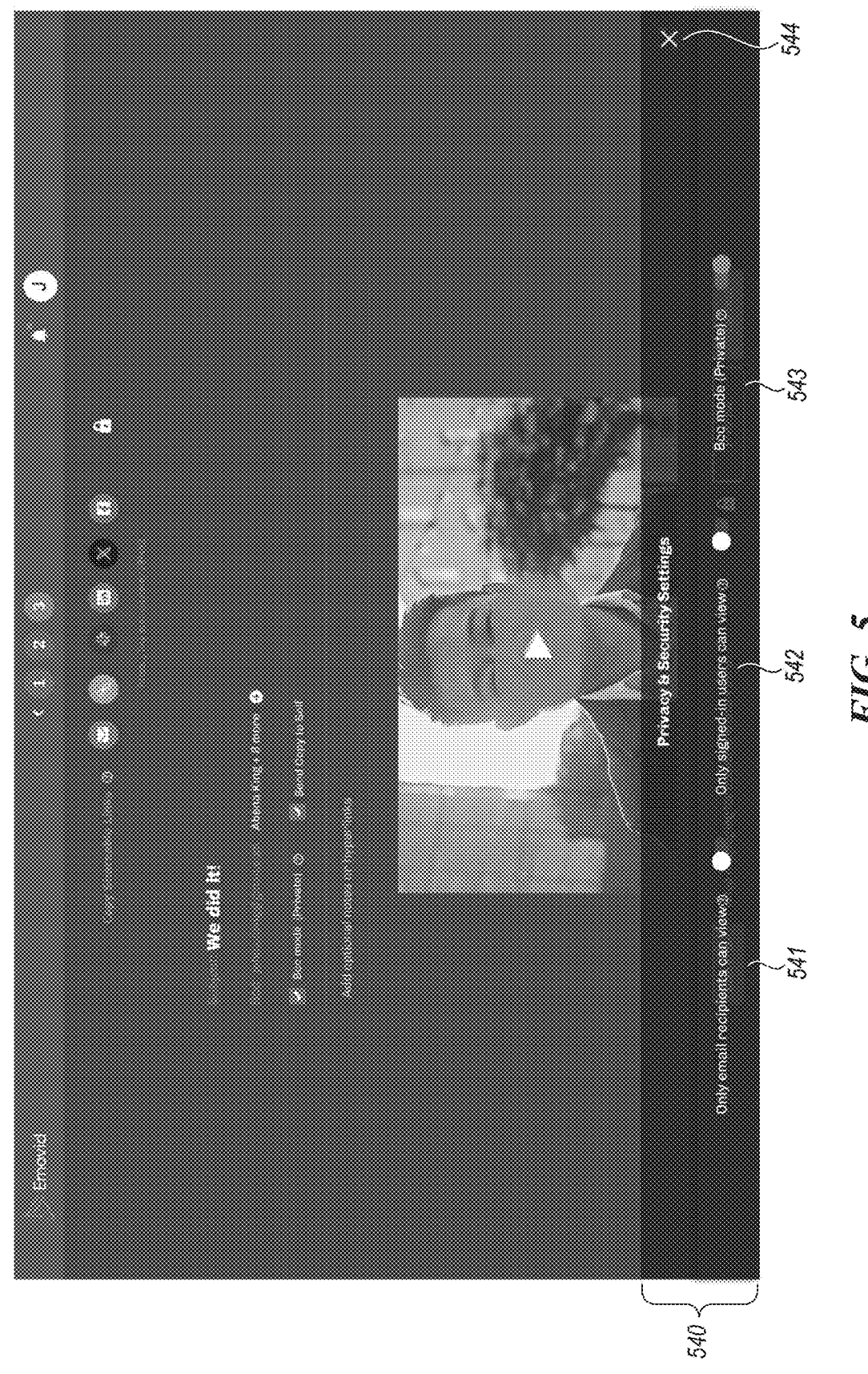
FIG. 5 is a display diagram showing sample contents of a second display presented by the facility in some embodiments to permit adjustment of privacy and security settings.

FIG. 5 is a display diagram showing sample contents of a second display presented by the facility in some embodiments to permit adjustment of privacy and security settings. In some embodiments, the facility presents display 500 in response to the user activating lock icon 432 shown in FIG. 4. It can be seen that the privacy and security settings 540 presented by the facility include a toggle 541 specifying whether only the addressees can play the segment, or whether the addressees can pass a link to the segment to non-addressee users who are permitted the segment; a toggle 542 specifying whether users have to be signed in order to play the segment; and toggle 543 specifying whether the segment will be sent in parallel conversation mode. Here, the sender has set the toggles such that a user need not be an email recipient to view; the user need not be signed in to view; and the segment is distributed in parallel conversation mode. The user can activate control 544 in order to dismiss the privacy and security settings.

In act 303, the facility sends the segment individually to the specified addressees, such as in response to the sender's activation of the send now button 434 shown in FIG. 4. In some embodiments, this sending is via email, SMS, Slack, other messaging platforms, web pages, documents, etc. In some embodiments, rather than sending the segment to addressees identified by the sender, the facility causes a link that can be followed to display and respond to the segment to be posted in a place where people interested in the segment might see it, such as on a web page, in a Slack channel or other discussion thread, or another public forum. Such a posted link can in many cases be re-shared by people who come across its posting.

Figure 6:
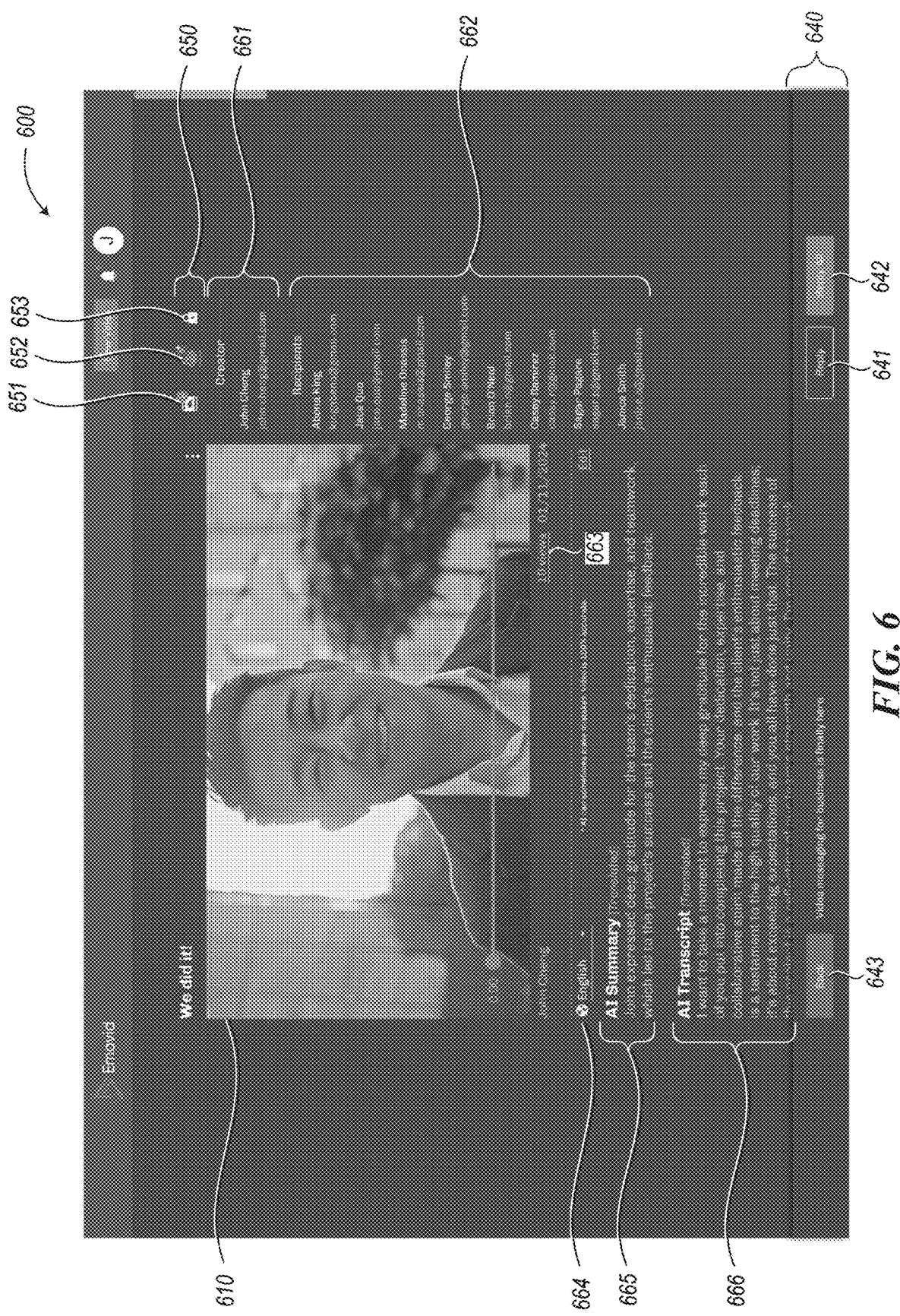
FIG. 6 shows sample contents of a third display presented by the facility in some embodiments to show one view of a sent segment.

FIG. 6 shows sample contents of a third display presented by the facility in some embodiments to show one view of a sent segment. In some embodiments, the facility presents display 600 in response to the sender's activation of the send now button 434 shown in FIG. 4. The display includes a region 610 in which the segment can be played, accompanied by the title or subject of the segment and the sender's name. The display also includes control region 640, containing a reply button 641 that can be used to reply to the segment; a reply all button 642 that can be used to reply to all of the recipients; and a back control 643 to return to an earlier display state. The display also contains a navigation area 650, which in turn contains navigation icon 651 that can be selected in order to display responses received from addressees; a navigation icon 652 that can be used to display the sender and addressees; and a navigation icon 653 that can be activated to display privacy and security controls. Here, navigation icon 652 has been selected, such that identifying information 661 for the sender and identifying information 662 for the addressees is displayed below the navigation icons. The display further includes an indication 663 of the number of times the video has been viewed so far; a selection control 664 that the sender can use to select a natural language; a summary 665 generated by artificial intelligence of the information conveyed during the segment; and a transcript 666 generated for the segment by speech transcription software. In some embodiments (not shown), the display further includes an automatically-derived list of action items that would be appropriate or helpful to take based on contents of the segment or one or more responses. In some embodiments, the user can select one of these action items in order to initiate a workflow for performing the action item.

Figure 7:
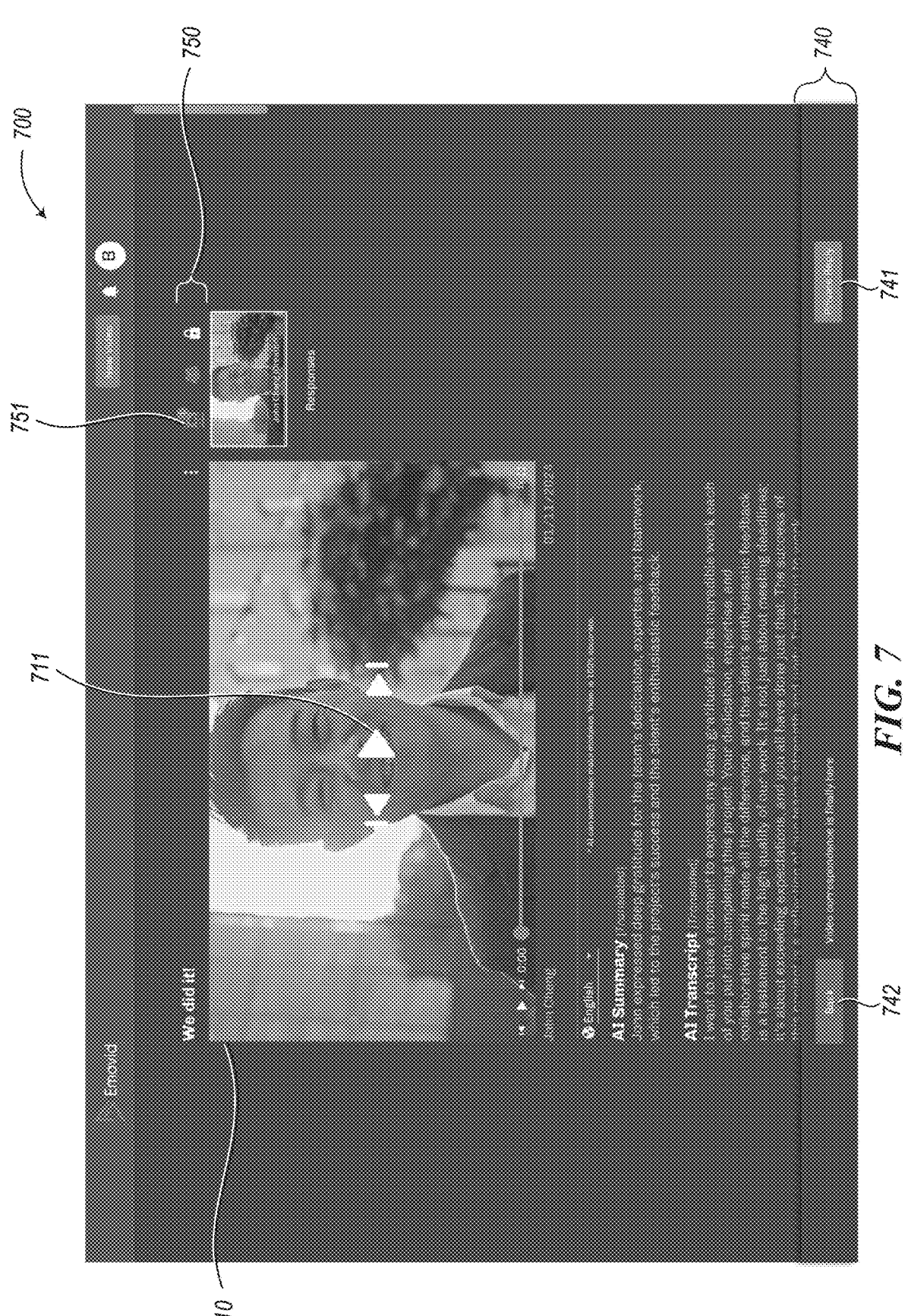
FIG. 7 is a display diagram showing sample contents of a fourth display presented by the facility in some embodiments to display an initial list of responses to the segment by addressees.

FIG. 7 is a display diagram showing sample contents of a fourth display presented by the facility in some embodiments to display an initial list of responses to the segment by addressees. It can be seen in navigation icon area 750 that user has selected navigation icon 751, causing an empty list of responses to be displayed under the indication of the original segment.

Figure 8:
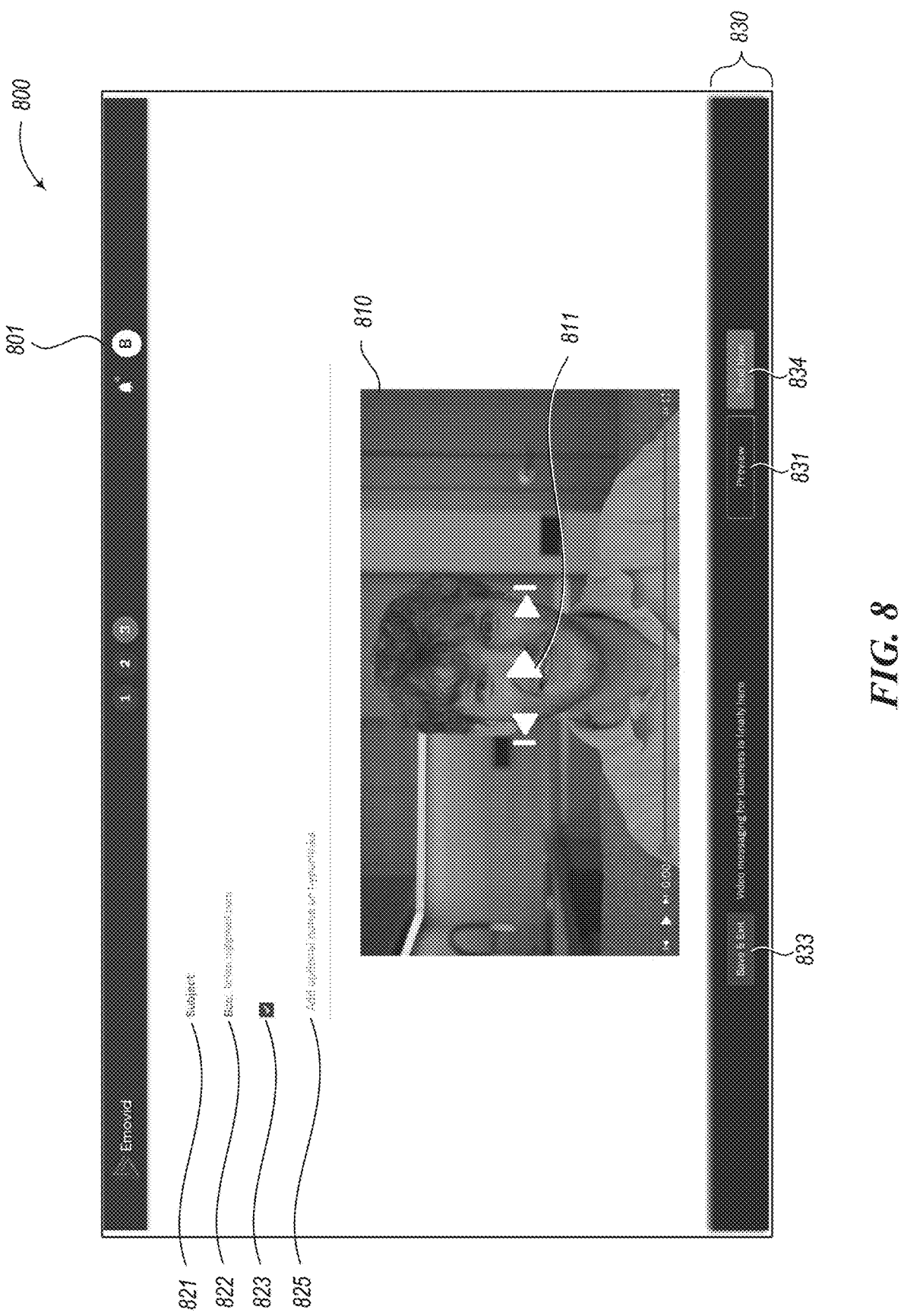
FIG. 8 is a display diagram showing sample contents of a fifth display presented by the facility in some embodiments to show an addressee's creation of a response segment.

FIG. 8 is a display diagram showing sample contents of a fifth display presented by the facility in some embodiments to show an addressee's creation of a response segment. The display 800 includes user icon 801 containing the letter "B" identifying the addressee Brian O'Neal. It can be seen that this addressee has recorded a response segment 810, which can be played using control 811. The addressee can specify the following information for this response segment: a subject 821; addressees 822 (none of which will be identified to each other); and optional notes or hyperlinks 825 for the response segment message. The display also includes control area 830, which in turn contains a preview control 831; a save and exit control 833, and a send now control 834 that the addressee can activate in order to send the response segment to the sender.

Figure 9:
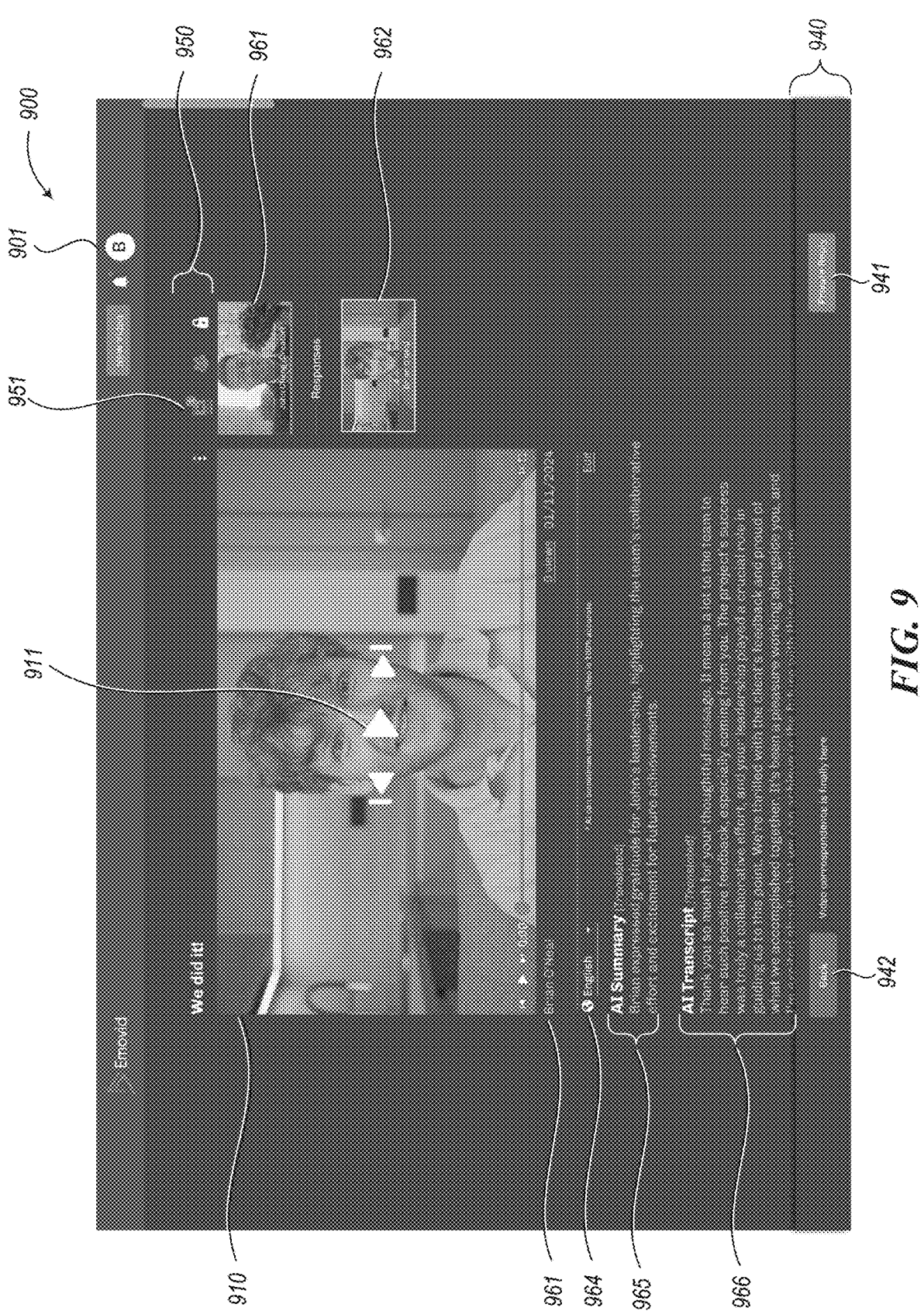
FIG. 9 is a display diagram showing sample contents of a sixth display presented by the facility in some embodiments to reflect to an addressee that they have sent a response segment to the original segment.

FIG. 9 is a display diagram showing sample contents of a sixth display presented by the facility in some embodiments to reflect to an addressee that they have sent a response segment to the original segment. The display 900 includes user identity icon 901 identifying the user as the addressee Brian O'Neal. The display includes an area 910 in which the response segment is displayed and can be played by activating the play control 911. The display further includes a control section 940, which in turn contains a private reply control 941 and a back control 942. The display further shows that, among the navigation icons 950, the left-most navigation icon 951 is selected, causing all of the responses known to this user to be displayed. Accordingly, in the area beneath, the original segment 961 from the sender is shown, as well as the response segment 962 sent by the address Brian O'Neal. It is significant that, while other response may have been sent by other addressees, these are not accessible to the user Brian O'Neal, and thus they are not shown in this column. The display also includes information about the selected response segment 962, including the user 961 who originated it, a natural language 964 for text about it; an automatically summary 965 of the response segment; and a transcript 966 of the response segment.

In act 304, the facility receives responses to the sender from individual addressees, such as the response segment discussed above in connection with FIGS. 8 and 9. In act 305, the facility organizes the responses received in act 304 in a focused parallel conversation interface.

Figure 10:
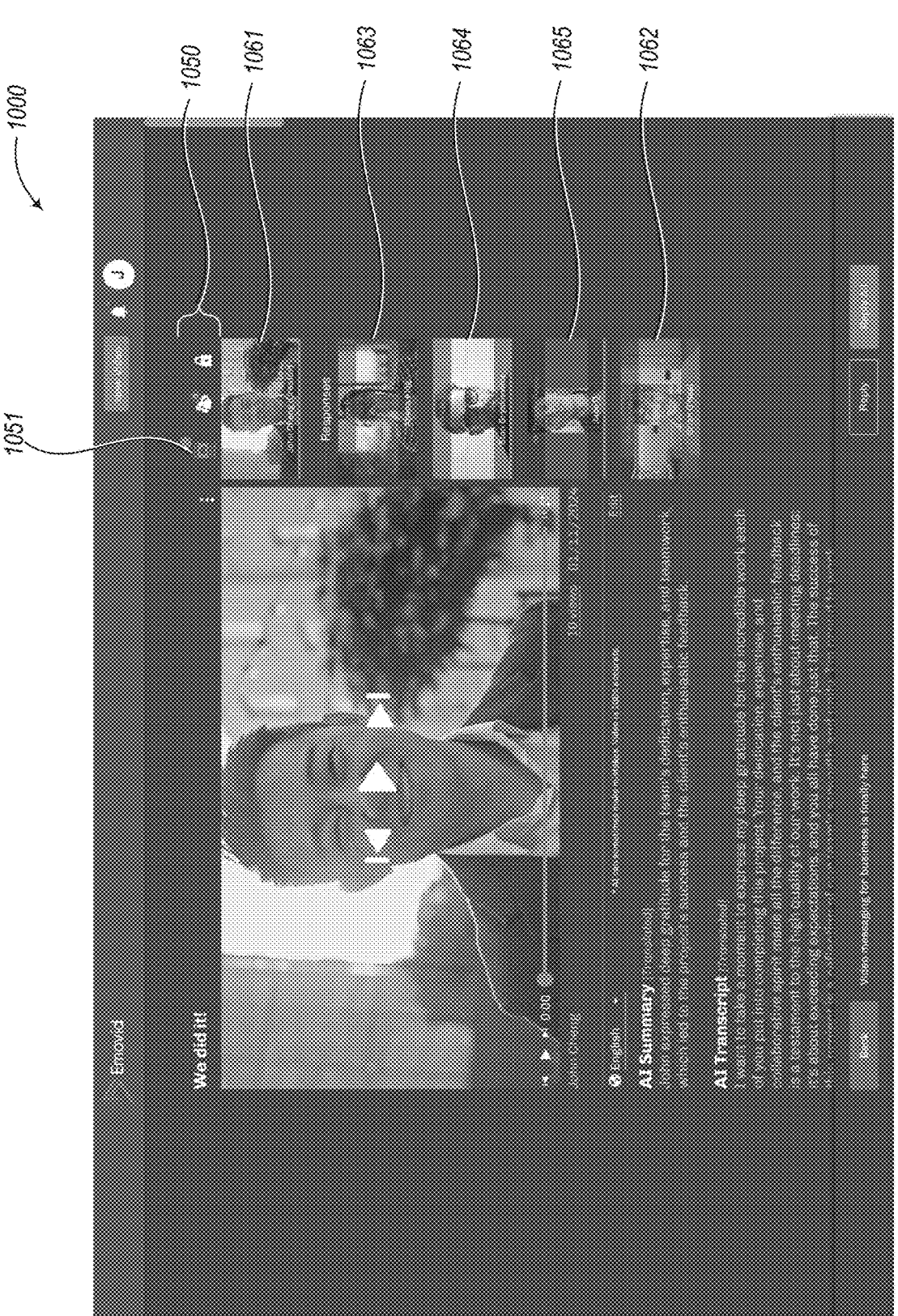
FIG. 10 is a display diagram showing sample contents of a seventh display presented by the facility in some embodiments to show the sender's view of responses to the sender's segment sent by its addressees.

FIG. 10 is a display diagram showing sample contents of a seventh display presented by the facility in some embodiments to show the sender's view of responses to the sender's segment sent by its addressees. The display 1000 includes a user identification icon showing that the user is John Cheng, the sender of the original segment. In navigation icon area 1050, navigation icon 1051 is selected, causing the responses visible to this user to be shown below. Below is the original segment 1061 and responses 1062-1065 received by the sender from different addressees. In particular, response 1062 is the response whose generation is shown in FIGS. 8 and 9 and discussed above. The sender can select any of these responses to play them, reply to them, etc. The display of FIG. 10 contrasts with that of FIG. 9 in that the display of FIG. 10 shows conversations relating to the original segment with all addressees, while the display of FIG. 9 shows only conversations relating to the original segment that are with the addressee viewing that display.

Figure 11:
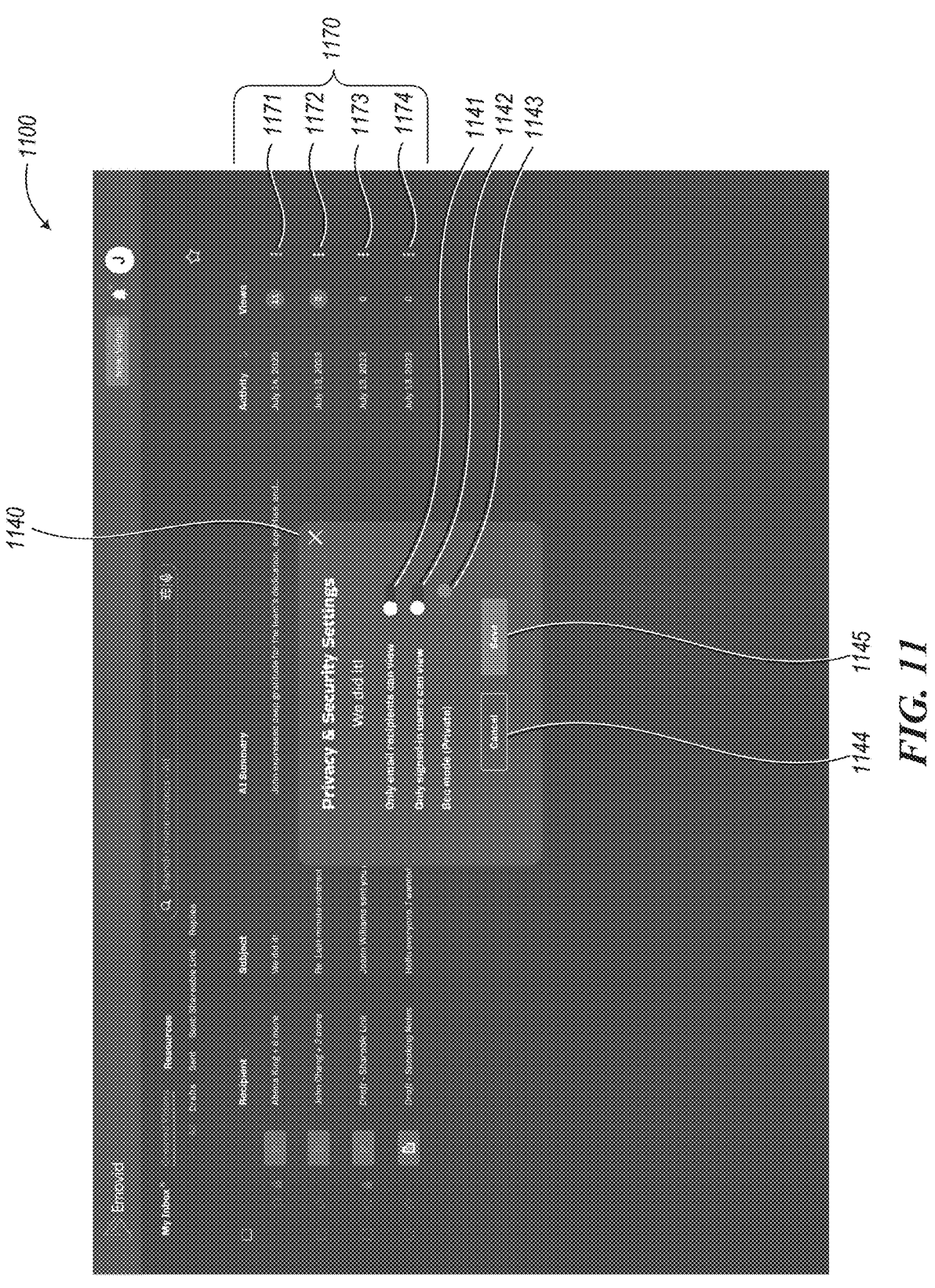
FIG. 11 is a display diagram showing sample contents of an eighth display presented by the facility in some embodiments to display all of the sender's segment conversations.

FIG. 11 is a display diagram showing sample contents of an eighth display presented by the facility in some embodiments to display all of the sender's segment conversations. In some embodiments, the facility presents this display in response to the sender selecting an inbox entry from a navigation menu, such as one displayed when the user selects their identification icon at the upper right corner of display 1000 shown in FIG. 10. The display 1100 shows a list 1170 of these conversations 1171-1174. Conversation 1171 is the conversation whose details are discussed above in connection with FIGS. 4-10. The user can select any of these conversations in order to display a detailed view of the conversation. By using the ellipsis control at the right end of each of the conversation rows, the user can review and adjust the privacy and security settings for that conversation. Here, the user has given that command with respect to conversation 1171, causing the display of window 1140. That window shows that the toggle 1140 for only recipients can view is off; the toggle 1142 for only signed-in users can view is off; and the toggle 1143 for BCC mode is on. The user can adjust any of these toggles, and activate a save control 1145 to make the corresponding changes to the privacy and security settings, or activate the cancel control 1144 in order to abort changing the privacy and security settings.

Figure 12:
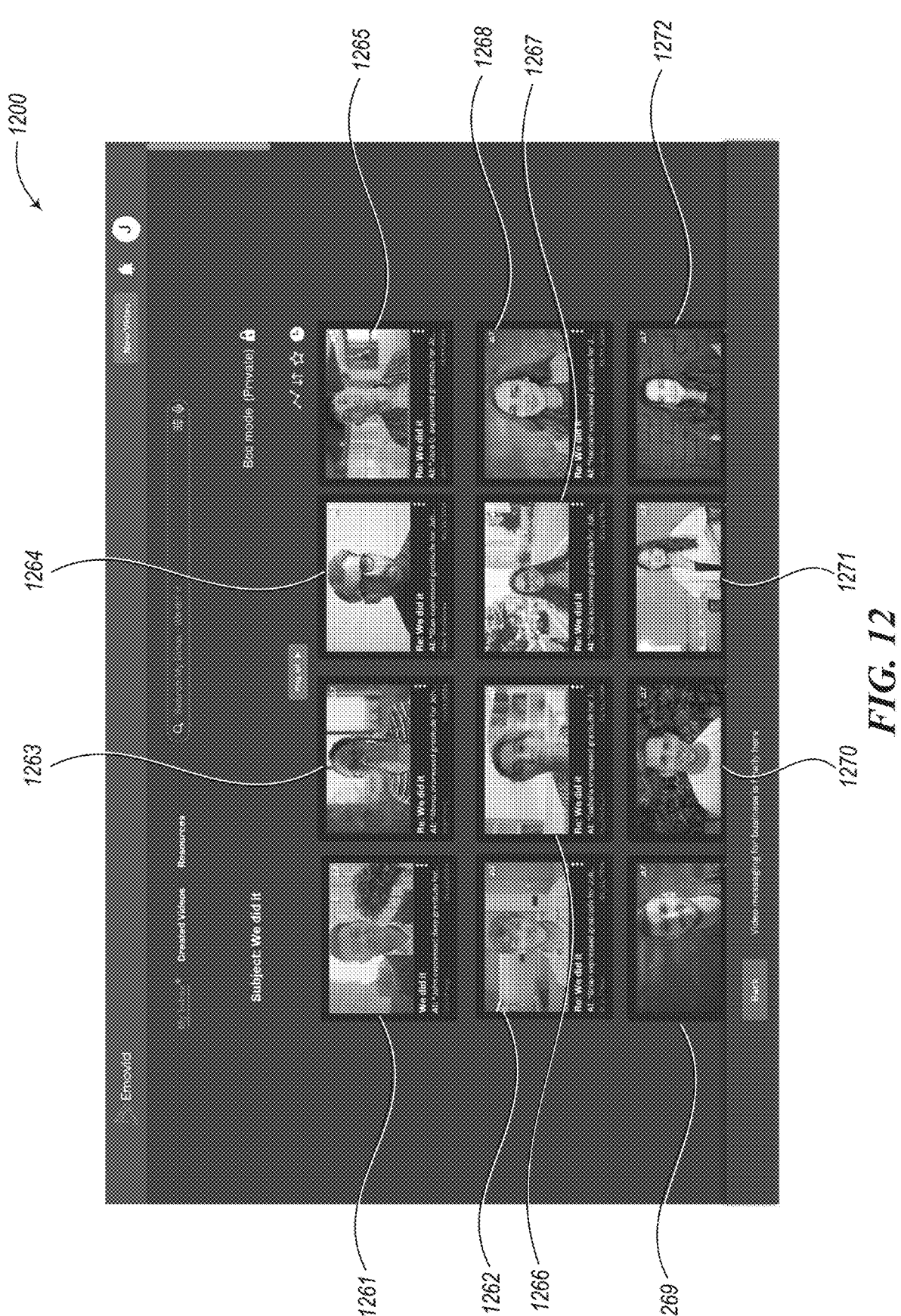
FIG. 12 is a display diagram showing sample contents of a ninth display presented by the facility in some embodiments to show a detailed view of an individual segment conversation.

FIG. 12 is a display diagram showing sample contents of a ninth display presented by the facility in some embodiments to show a detailed view of an individual segment conversation. In some embodiments, the facility presents display 1200 in response to the user selecting conversation 1171 shown in FIG. 11. The display shows the original segment 1261, as well as responses 1262-1272.

In act 306, the facility produces and presents response analytics to characterize and/or categorize the responses. In act 307, the facility recommends and performs targeted follow-ups with groups of addressees based upon the response analytics produced in act 306. After FIG. 3, this process concludes.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 13:
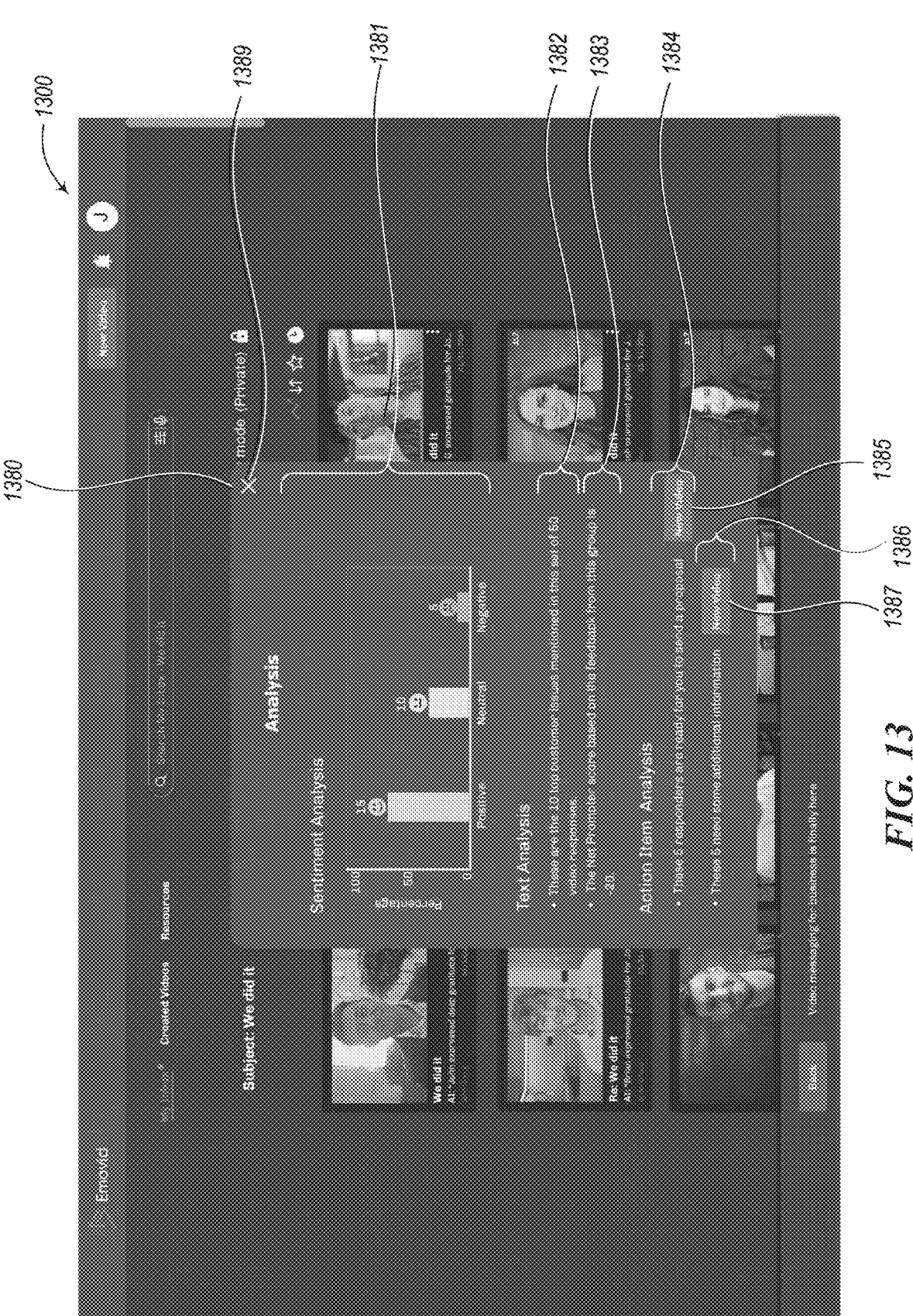
FIG. 13 is a display diagram showing sample contents of a tenth display presented by the facility in some embodiments to present response analytics, and recommend and perform targeted follow-ups with groups of addressees based upon them.

FIG. 13 is a display diagram showing sample contents of a tenth display presented by the facility in some embodiments to present response analytics, and recommend and perform targeted follow-ups with groups of addressees based upon them. In some embodiments, the facility presents display 1300 in response to the user selecting the graph icon above response 1265 in display 1200 shown in FIG. 12. Display 1300 includes an analytics window 1380 containing analysis results for the responses to the segment. In some embodiments, the facility makes one or more invocations of a language model-such as a large language model—in order to generate these analysis results. These include a sentiment analysis graph 1381 categorizing the prevailing sentiment of the responses, based upon applying sentiment analysis techniques to the audio and video of the responses, the audio of the responses, or the textual transcript of the responses. Here, the graph shows that 15 of the responses reflect a positive sentiment, 10 reflect a neutral sentiment, and five reflect a negative sentiment. In some embodiments, the sender can click on the bar for one of the sentiment levels in order to, for example, the names or user categories of the corresponding addressees; play the response segments represented therein; send a follow-up segment to these addressees; etc. This window further includes conclusions 1382 and 1383 that result from analyzing the text of the responses. The analytics window further includes analysis results for which proposed action items are provided. The first is analysis result 1384, in which five addressees have been determined based on their responses to be ready to receive a proposal. This item is accompanied by control 1385 that the sender can activate in order to record and send a new video segment to these five addressees making a proposal. These items also include item 1386 identifying five addressees whose responses indicate they need additional information. This item is accompanied by a control 1387 that the sender can activate in order to record and send a follow up video segment to these five addressees providing the sought additional information.

The various embodiments described above can be combined to provide further embodiments. All of the U.S. patents, U.S. patent application publications, U.S. Pat. applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a computing system, the method comprising:
recording an original video segment depicting a first user;
receiving first input specifying a multiplicity of addressee users;
making the original video segment available to view by each of the multiplicity of addressee users;
for each addressee user of a plurality of addressee users among the multiplicity of addressee users, receiving an indication that the addressee user has recorded a response video segment to the original video segment;
causing visual indications of response video segments to be simultaneously displayed to the first user;
causing one or more further video segments depicting the first user to be recorded; and making each of the further video segments available to view by at least one addressee user of the multiplicity of addressee users, and not available to view by at least one other addressee user of the multiplicity of addressee users, wherein at least one of the further video segments may be made available to view by a different group of addressee users of the multiplicity of addressee users than at least one of the original video segment, response video segments, or further video segments.

2. The method of claim 1 wherein each of the visual indications whose display is caused comprises a frame from the response video segment indicated by the visual indications.

3. The method of claim 1 wherein each of the visual indications whose display is caused comprises a name of the addressee user who recorded the response video segment indicated by the visual indication.

4. The method of claim 1, further comprising:
receiving second input selecting one of the displayed visual indications; and
in response to at least receiving the second input, causing the response video segment indicated by the selected visual indication to be played.

5. The method of claim 1, wherein causing the further video segment depicting the first user to be recorded comprises:
receiving second input selecting a visual indication of the displayed visual indications; and
in response to at least receiving the second input:
causing the further video segment depicting the first user to be recorded; and
making the further video segment available to view by an addressee user who recorded the response video segment indicated by the selected visual indication, and not available to view by addressee users who did not record the response video segment indicated by the selected visual indication.

6. The method of claim 1, further comprising:
receiving second input specifying a criterion with respect to the response video segments;
performing an action among sorting, filtering, and searching against the response video segments using the second input to obtain a result; and
causing the result to be displayed to the first user.

7. The method of claim 6 wherein the performing relies on metadata,
transcription results, or linguistic analysis of the response video segments.

8. The method of claim 1, further comprising:
invoking an AI engine to derive insights from at least a portion of the response video segments; and
causing the derived insights to be displayed to the first user.

9. The method of claim 8 wherein the AI engine is a language model.

10. The method of claim 8 wherein the AI engine is a natural language processing tool.

11. The method of claim 8 wherein the insights derived by the AI engine comprise sentiments expressed in the at least a portion of the response video segments.

12. The method of claim 8 wherein the insights derived by the AI engine comprise results of surveys answered in the at least a portion of the response video segments.

13. The method of claim 8 wherein the insights derived by the AI engine summarize a proper subset of the response video segments, the method further comprising:
making the further video segment available to view by the addressee users who recorded the proper subset of response video segments, and not available to view by addressee users who did not record a response video segment among the proper subset of response video segments.

14. One or more memories collectively having contents configured to cause a computing system to perform a method, the method comprising:
recording an original video segment depicting a first user;
making the original video segment available to view by each of a multiplicity of users;
for each user of a plurality of users among the multiplicity of users, receiving an indication that the user has recorded a response video segment to the original video segment;
causing visual indications of the response video segments to be simultaneously displayed to the first user;
causing one or more further video segments depicting the first user to be recorded; and
making each of the further video segments available to view by at least one user of the multiplicity of users, and not available to view by at least one other user of the multiplicity of users, wherein at least one of the further video segments may be made available to view by a different group of addressee users of the multiplicity of addressee users than at least one of the original video segment, response video segments, or further video segments.

15. The one or more memories of claim 14, the method further comprising:
receiving second input selecting one of the displayed visual indications; and
in response to at least receiving the second input, causing the response video segment indicated by the selected visual indication to be played.

16. The one or more memories of claim 14, the wherein causing the further video segment depicting the first user to be recorded further comprises:
receiving second input selecting a visual indication of the displayed visual indications; and
in response to at least receiving the second input:
causing the further video segment depicting the first user to be recorded; and
making the further video segment available to view by a user who recorded the response video segment indicated by the selected visual indication, and not available to view by users who did not record the response video segment indicated by the selected visual indication.

17. The one or more memories of claim 14, the method further comprising:
receiving second input specifying a criterion with respect to the response video segments;
performing an action among sorting, filtering, and searching against the response video segments using the second input to obtain a result; and
causing the result to be displayed to the first user.

18. The one or more memories of claim 17 wherein the performing relies on metadata, transcription results, or linguistic analysis of the response video segments.

19. The one or more memories of claim 14, the method further comprising:
invoking a language model to generate a summary of at least a portion of the response video segments; and causing the generated summary to be displayed to the first user.

20. The one or more memories of claim 19 wherein the summary summarizes a proper subset of the response video segments, the method further comprising:

making the further video segment available to view by the users who recorded the proper subset of response video segments, and not available to view by users who did not record a response video segment among the proper subset of response video segments.

21. The one or more memories of claim 14, the method further comprising:

receiving first input specifying the multiplicity of users; and sending a message to each of the multiplicity of users notifying recipients of the message of the original video segment.

22. The one or more memories of claim 14, the method further comprising:

receiving first input specifying a forum accessible to the multiplicity of users; and causing to be posted to the specified forum a link to the original video segment.

23. A computing system, comprising:

one or more processors; and one or more memories collectively having contents configured to cause the one or more processors to perform a method, the method comprising:

recording an original video segment depicting a first user;

receiving first input specifying a multiplicity of addressee users;

making the original video segment available to view by each of the multiplicity of addressee users;

for each addressee user of a plurality of addressee users among the multiplicity of addressee users, receiving an indication that the addressee user has recorded a response video segment to the original video segment;

causing visual indications of response video segments to be simultaneously displayed to the first user;

causing one or more further video segments depicting the first user to be recorded; and making each of the further video segments available to view by at least one addressee user of the multiplicity of addressee users, and not available to view by at least one other addressee user of the multiplicity of addressee users, wherein at least one of the further video segments may be made available to view by a different group of addressee users of the multiplicity of addressee users than at least one of the original video segment, response video segments, or further video segments.

24. The computing system of claim 23, the method further comprising:

receiving second input selecting one of the displayed visual indications; and in response to at least receiving the second input, causing the response video segment indicated by the selected visual indication to be played.

25. The computing system of claim 23, wherein causing the further video segment depicting the first user to be recorded comprises:

receiving second input selecting a visual indication of the displayed visual indications; and in response to at least receiving the second input:

causing the further video segment depicting the first user to be recorded; and making the further video segment available to view by an addressee user who recorded the response video segment indicated by the selected visual indication, and not available to view by addressee users who did not record the response video segment indicated by the selected visual indication.

26. The computing system of claim 23, the method further comprising:

invoking an AI engine to derive insights from at least a portion of the response video segments that summarize a proper subset of the response video segments;

causing the derived insights to be displayed to the first user; and making the further video segment available to view by the addressee users who recorded the proper subset of response video segments, and not available to view by addressee users who did not record a response video segment among the proper subset of response video segments.

* * * * *